April 12, 1932. W. V. N. POWELSON ET AL 1,853,081
CONTROL MEANS FOR MOORING MASTS
Original Filed Sept. 21, 1921  2 Sheets-Sheet 1
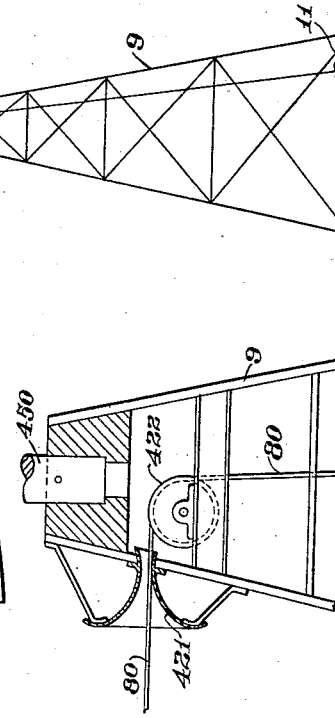
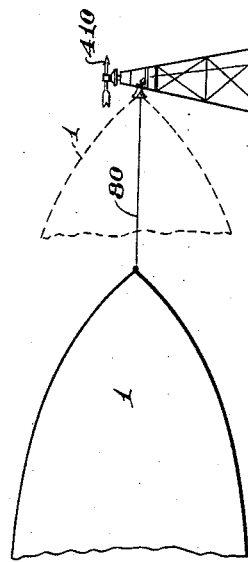
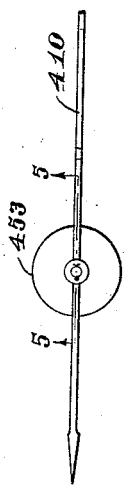
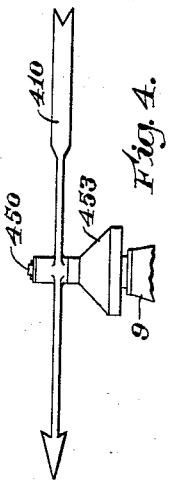
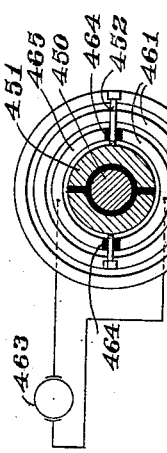
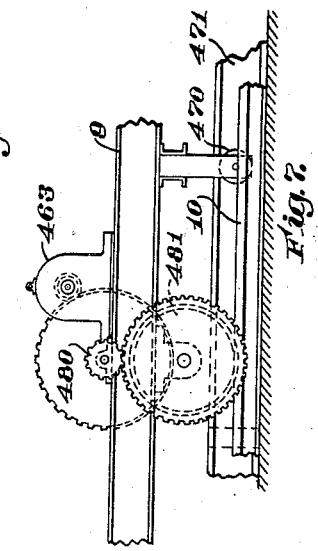
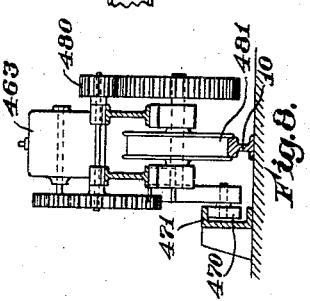
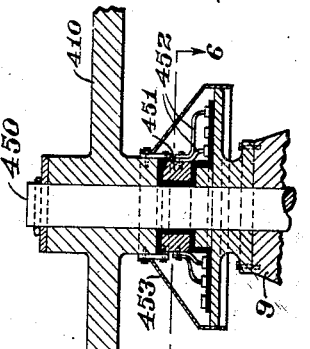
Inventors
Wilfrid V.N. Powelson
Warren Travell
by Mitchell Chadwick & Kent
Attorneys

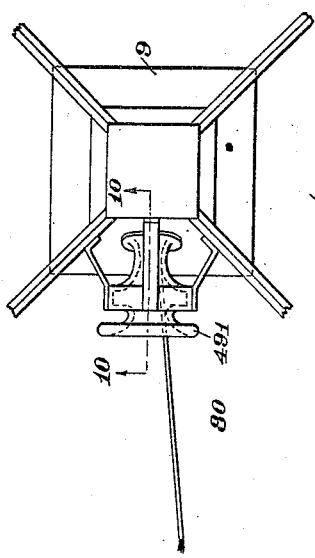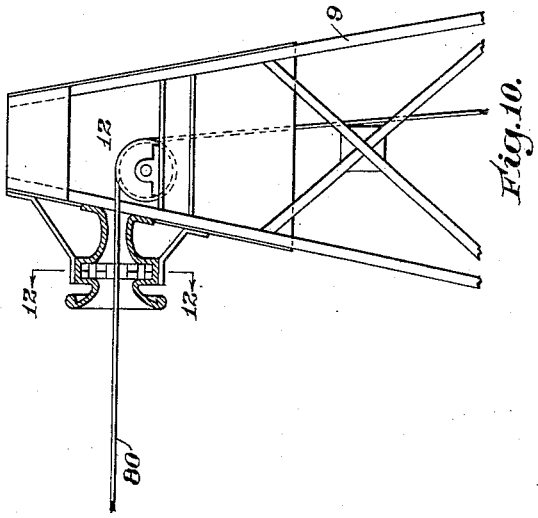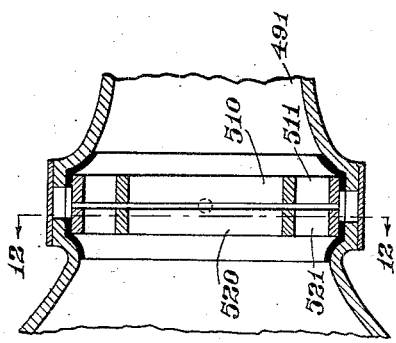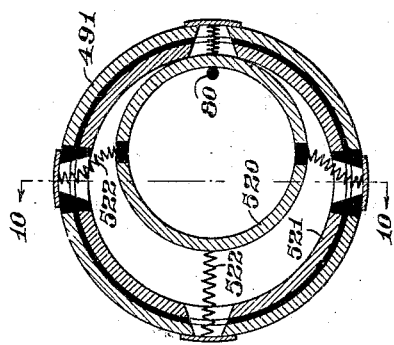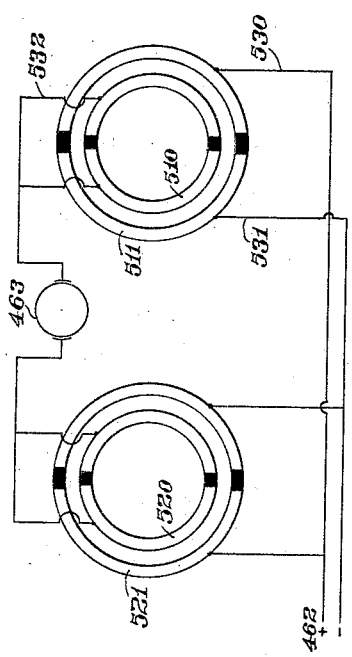

Patented Apr. 12, 1932

1,853,081

UNITED STATES PATENT OFFICE

WILFRID V. N. POWELSON, OF NEW YORK, N. Y., AND WARREN TRAVELL, OF SAN BERNARDINO, CALIFORNIA

CONTROL MEANS FOR MOORING MASTS

Original application filed September 21, 1921, Serial No. 502,127. Divided and this application filed March 17, 1931. Serial No. 523,253.

This invention pertains to control means for mooring masts. More particularly, it pertains to a control system for such masts which operates automatically in response to deviations from a predetermined condition. In a preferred species of the invention, it comprises apparatus arranged to set in motion corrective influences tending to bring one or more mooring masts into a predetermined or desired position, which may in itself be changed from that position which was last previously the predetermined or desired position.

It finds usefulness not only in connection with a single rotatable mooring mast, or a group of single masts, where responsive rotation of the mast may be sought to compensate for changes in the direction of the wind, but also in conjunction with a plurality of movable mooring masts co-ordinated in a system and operated so that one or both may move on a fixed track, conveniently circular. It is an object of our invention to facilitate the handling of large airships at stations or ports of call by permitting them to remain safely moored, regardless of weather conditions.

For such safe handling of an airship, we provide in conjunction with the invention a rotatable mooring tower, preferably located at one end of a shelter, which may be a pit, hangar or other berth. With this rotatable tower there may, if desired, be associated a second tower movable on a track encircling the rotatable tower. Another arrangement is that of a berth, a track encircling it, and two mooring towers, located at ends of a diameter of the circle and movable on the track around the circle, the track being so located with respect to the berth that after an airship has been moored, the towers may be moved on the track so as to bring the airship directly over the berth. Other arrangements may be employed if desired.

To make the handling of airships by mooring towers more efficient, the invention provides means for maintaining the tower or towers and the moored airship head-on to the wind at all times, and for limiting the side pull in the attachment line leading to the second or tail tower, if there be such.

In the practical application of the invention, various equivalent devices may be employed in substitution for those which are herein shown as illustrating the principles involved. Variations may be made in many respects without departing from the scope of the invention.

In the accompanying drawings, forming a part hereof, which are more or less diagrammatic:

Figure 1 is a side elevation of a movable mooring tower with vane control;

Figure 2 is a medial elevation, on a larger scale, of the top of the tower of Figure 1;

Figure 3 is a plan of the control vane of Figure 1;

Figure 4 is a side elevation of the same;

Figure 5 is an elevation, on a larger scale, in section on line 5—5 of Figure 3;

Figure 6 is a plan of details of the same showing collector rings and wiring diagram, in section on line 6—6 of Figure 5;

Figure 7 is a side elevation of the tower moving means;

Figure 8 is an end elevation of the same;

Figure 9 is a plan showing top of mooring tower and device for controlling movement of tower, actuated by change in position of tail rope;

Figure 10 is an elevation of the same in section on line 10—10 of Figure 9;

Figure 11 is an elevation like Figure 1 showing a detail on a larger scale;

Figure 12 is an elevation in cross-section on line 12—12 of Figures 10 and 11; and Figure 13 is a wiring diagram for the tower mooring device shown in Figure 9.

Figure 1 shows a mooring tower 9 movable on track 10 and having at its top a vane 410 which, as moved by the wind, controls the movement of tower 9. The wind tends to maintain the airship 1 always in a position directly to the leeward of a tower to which it is moored. For certain purposes, as for the facing of the tower toward the ship for mooring, or, after mooring, for settling the ship into a cradle on tracks or bringing its tail end into proximity to another tower, it may be desired to move either tower, so as to maintain a proper facing to the ship in case of a changed direction of the wind if moored to a single tower, or so that the tail of the ship will be pointed toward that other tower by the wind or so that the ship's body will lie over a particular area of ground. As hereinafter explained, this becomes possible by the present invention. Therefore the track 10 may be circular around the base of the tower, merely to face the tower about; or it may be circular about the berth; or circular about another tower.

The upper portion of head tower 9 is shown in greater detail in Figures 2, 3, 4, 5 and 6. The vane 410, revolvable about the central pin 450, carries with it an insulated ring 451 to which are attached current collectors 452. These collectors, on the rotation of the vane 410, make contacts with collector rings 461, which rings are connected by wiring to a source of electrical power 462 and to the motor 463, which serves to move the tower on its track. This motor with its associated mechanism is shown in greater detail in Figures 7 and 8, and may be of any well known and suitable type.

Figure 6 shows diagrammatically a wiring diagram indicating the method of working of this tower-moving device so that, upon the swinging of the vane 410 in either direction, a current is sent through the motor 463 in suitable direction to propel the tower along its track until the face of the tower is in line with the ship, at which position the brushes 452 rest upon the insulation 464 between the two segments 465 which constitute terminals of motor 463. Figure 5 shows a shield 453 protecting the electrical apparatus from the weather.

This tower moving device may be used on a head tower for maintaining the point of attachment of the rope 80 always on the leeward side of said tower, facing the bow end of the airship. It also may be used on a tail tower for keeping that tower in the direction from the head tower in which the wind is blowing. Figure 2 shows a concave receptacle comprising a funnel-shaped device 421 through which the attachment rope 80 may be led around a sheave 422 and thence downward to the control means 11.

Figures 9, 10, 11, 12 and 13 refer to a means for controlling the movement of a tail mooring tower so as to automatically maintain it in a position directly in the rear of an airship moored thereto. The tower 9, movable on a circular track, has moored the thereto an airship 1 by a rope 80 leading over a sheave 12 and thence to a control means not shown. When the tail end of the airship swings to one side, causing its axis to take a position making an angle with the theoretical line joining the centers of the two mooring towers, the tail rope 80 is drawn correspondingly to one side, pressing a pair of floating segmental conductor rings 520 and 510, which are really motor terminals, to that side and into contact with the fixed rings 521 and 511 whose segments at opposite sides are of opposite polarity for delivering current to the motor in one direction or the opposite.

When free, the inner rings 520 and 510 are brought back to their normal position concentric with rings 521 and 511 by means of springs 522 or other equivalent devices. These rings 510, 511 and 520, 521 are insulated and connected by wiring to a source of electric power 462 and to the tower moving motor 463, as indicated in the wiring diagram shown in Figure 13; so that when the inner rings 510, 520 are pressed to either side by the deflection of the connection rope 80, the motor 463 operates automatically as explained below, in whichever direction is needed, to bring the tail tower to a position directly in the rear of the airship 1.

When this is attained, the circuit is broken at the rings and the motor stops. It will be seen from the diagram of Figure 13 that the movement of rings 510 and 520 to the left, causing contact with the left side of 511 and 521, causes current to flow through the motor in one direction, while the movement of rings 510 and 520 to the right, causing contact with the right half of rings 511 and 521, reverses the direction of flow of the current through the motor, causing it to turn in an opposite direction.

The result obtained by this mechanism is that when the wind causes the airship to move to one side, to the right, for instance, the mooring mast is moved in the same direction to a position in the rear of the airship, and when the wind causes the tail of the airship to swing to the left, the mooring mast is moved correspondingly to the left; thus always maintaining the tail mooring tower directly to the rearward of the tail end of the airship.

Figures 9, 10 and 11 show a bell-shaped mouth providing entrance of the attachment rope 80 to its point of attachment with the tower. This bell-shape permits deflection of the rope in all directions without causing damage thereto. The device of Figures 9–13 can be used as a head mooring tower, if desired, in place of the wind vane apparatus shown in Figures 1–6, in which case the airship itself constitutes a wind vane. On swinging to either side of the predetermined normal relation to the mooring tower, the tower is set in motion to restore its normal relation.

It is thus possible by the present invention to control the relative position of two mooring towers or the relative position of a single mooring tower with respect to some other object. This may be by means of a wind vane or equivalent device, as shown in Figures 1 to 8, inclusive, or by means of the control apparatus disclosed more particularly in Figures 9 to 13, inclusive.

The subject matter claimed in this application constitutes a division of our copending application Serial No. 502,127, filed September 21, 1921, for "Means for mooring and housing airships." It is intended that the patent to be based on the present application shall cover, by suitable expression in the appended claims, whatever features of patentable novelty reside in the disclosure herein made.

We claim:

1. In equipment for mooring airships, a movable mooring mast and, associated therewith, means responsive to variations in the direction of the wind for moving said mooring mast from place to place.

2. In equipment for mooring airships, a rotatable mooring mast, and means responsive to variations in the direction of the wind for rotating said mooring mast, said means comprising a motor having a wind-vane control; and a flexible connection leading through a bearing member on said mooring mast to the airship, said flexible connection pressing against said bearing member upon change of wind direction and thereby cooperating with said motor in rotating said mooring mast.

3. In equipment for mooring an airship, the combination of a mooring tower and control means therefor actuated by the variation of the azimuth direction of the longitudinal axis of the airship.

4. In equipment for mooring an airship, the combination of a tower movable from place to place along a way; power means for moving said tower; and control means for said power means, including a device the azimuth position of which is regulated by the wind and which bears a normal fixed azimuth relation to the direction of the wind.

5. In equipment for mooring airships, the combination of a head tower; a tail tower movable on a track; power means for moving the tail tower; a vane movable by the wind; and a control for said power means actuated by movement of the vane.

6. In equipment for mooring an airship, the combination of a tower movable on a way; power means for moving said tower; and control means for said power means actuated by a variation of the azimuth direction of the longitudinal axis of the airship.

7. In equipment for mooring airships, a movable mooring mast, and, associated therewith, means responsive to variations in the position of the airship for moving said mooring mast.

8. In equipment for mooring airships, a rotatable mooring mast, and, associated therewith, means responsive to variations in the position of the airship for rotating said mooring mast.

9. In equipment for mooring airships, a mooring mast movable on a fixed track, power means for moving said mooring mast on said fixed track, and control means for said power means operating automatically in response to variations in the position of the airship relative to the mooring mast.

10. In equipment for mooring aircraft, a mooring mast provided with means movable about the axis of the mast for connecting aircraft thereto, and, associated therewith, means responsive to variations in the wind for moving said connecting means about said axis.

11. In equipment for mooring an airship, the combination of a mooring tower and control means for said tower, said control means being actuated by variations in the position of the connection between the tower and the airship.

12. Control apparatus for a mooring tower for aircraft comprising a pin disposed on said mooring tower, a wind-responsive member movably mounted on said pin; rings of opposite polarity around said pin; two electrical connecting-brushes, one for each ring, adapted to move with said wind-responsive member, each brush having one contact continuously on its own said ring; and a motive power circuit having opposed terminals, each terminal half-surrounding the pin, except that insulation zones separate these terminals on sides conforming to the wind direction; the said brushes each having its other contact running on said terminals and insulation zones, whereby the turning of the wind-responsive member and its brushes from the insulation zone moves its brushes to said terminals in the relation which operates the motive power and causes the tower to move in the same direction as that in which the wind has moved.

13. Control apparatus for a mooring tower for aircraft comprising a plurality of normally concentric conductor rings adapted to make and break an electric circuit by mutual eccentric engagement and subsequent disengagement and thereby to control the position of said tower.

14. In mooring equipment for airships, a mooring tower, a flexible connection extending from said tower to the airship, and power means for moving said tower, said flexible connection cooperating with said power means in bringing about movement of the tower in response to changes in the direction of the wind.

Signed at San Bernardino, California, this eleventh day of November, 1930.

WILFRID V. N. POWELSON.
WARREN TRAVELL.